US011586592B2

(12) United States Patent
Aahlad et al.

(10) Patent No.: US 11,586,592 B2
(45) Date of Patent: Feb. 21, 2023

(54) METHODS, DEVICES AND SYSTEMS FOR WRITER PRE-SELECTION IN DISTRIBUTED DATA SYSTEMS

(71) Applicant: WANdisco Inc., San Ramon, CA (US)

(72) Inventors: Yeturu Aahlad, Foster City, CA (US); Michal Dobisek, Prague (CZ); Naeem Akthar, Jacksonville, FL (US); Ramakrishna Thurimella, Centennial, CO (US); Christopher Mackey, Ballygowan (GB)

(73) Assignee: WANdisco, Inc., San Ramon, CA (US)

( * ) Notice: Subject to any disclaimer, the term of this patent is extended or adjusted under 35 U.S.C. 154(b) by 277 days.

(21) Appl. No.: 17/000,241

(22) Filed: Aug. 21, 2020

(65) Prior Publication Data

US 2022/0058162 A1 Feb. 24, 2022

(51) Int. Cl.
*G06F 16/182* (2019.01)
*G06F 16/16* (2019.01)
(Continued)

(52) U.S. Cl.
CPC ........ *G06F 16/184* (2019.01); *G06F 11/0772* (2013.01); *G06F 16/164* (2019.01); *G06F 16/1734* (2019.01); *G06F 16/1824* (2019.01)

(58) Field of Classification Search
CPC .. G06F 16/184; G06F 16/164; G06F 16/1824; G06F 16/1734; G06F 11/0772
See application file for complete search history.

(56) References Cited

U.S. PATENT DOCUMENTS

2007/0220420 A1 9/2007 Sanders
2010/0146331 A1 6/2010 Reed et al.
(Continued)

OTHER PUBLICATIONS

International Search Report and Written Opinion in PCT/US2021/033081 dated Oct. 4, 2021.

*Primary Examiner* — Hosain T Alam
*Assistant Examiner* — Anthony G Gemignani
(74) *Attorney, Agent, or Firm* — Young Law Firm, P.C.

(57) ABSTRACT

A computer-implemented method may comprise receiving proposals to mutate a data stored in a distributed and replicated file system coupled to a network, the distributed and replicated data system comprising a plurality of nodes, each comprising a server. A metadata service maintains and updates a replica of a namespace of the distributed and replicated file system and coordinates updates to the data by generating an ordered set of agreements corresponding to the received proposals, the ordered set of agreements specifying an order in which the nodes are to mutate data stored in data nodes and cause corresponding changes to the state of the namespace. For each agreement in the generated ordered set of agreements, a corresponding writers list may be provided that comprises an ordered list of nodes to execute the agreement and make corresponding changes to the namespace. The ordered set of agreements may then be sent to the plurality of nodes along with, for each agreement in the ordered set of agreements, the corresponding writers list or a pre-generated index thereto and each of the plurality of nodes may be configured to only execute agreements for which it is a first-listed node on the received writers list.

19 Claims, 8 Drawing Sheets

(51) Int. Cl.
*G06F 16/17* (2019.01)
*G06F 11/07* (2006.01)

(56) References Cited

U.S. PATENT DOCUMENTS

| | | |
|---|---|---|
| 2013/0232153 A1 | 9/2013 | Dhuse et al. |
| 2013/0238630 A1 | 9/2013 | Dhuse et al. |
| 2014/0081927 A1 | 3/2014 | Lipcon et al. |
| 2014/0019405 A1 | 4/2014 | Borthakur et al. |
| 2014/0317448 A1 | 10/2014 | Rash et al. |
| 2015/0067004 A1* | 3/2015 | Shvachko ............. G06F 16/166 707/827 |
| 2015/0074683 A1 | 3/2015 | Singh et al. |
| 2015/0278244 A1* | 10/2015 | Shvachko ............. G06F 16/182 707/634 |
| 2015/0293817 A1 | 10/2015 | Subramanian et al. |
| 2016/0306799 A1 | 10/2016 | Tata |
| 2016/0306867 A1 | 10/2016 | Deng et al. |
| 2017/0193002 A1 | 7/2017 | Shvachko |
| 2017/0318094 A1 | 11/2017 | Slik |
| 2018/0115456 A1* | 4/2018 | Bendre ............... H04L 41/0663 |
| 2018/0150490 A1 | 5/2018 | Lipcon |
| 2018/0203866 A1 | 7/2018 | Surcouf et al. |
| 2018/0267734 A1 | 9/2018 | Volvovski et al. |
| 2018/0332367 A1 | 11/2018 | Kaitchuck et al. |
| 2019/0370365 A1 | 12/2019 | Chalakov et al. |

\* cited by examiner

METHODS, DEVICES AND SYSTEMS FOR WRITER PRE-SELECTION IN DISTRIBUTED DATA SYSTEMS

CROSS REFERENCE TO RELATED APPLICATIONS

The present application is related in subject matter to commonly-assigned U.S. patent application Ser. No. 15/457,837 filed Mar. 13, 2017; Ser. No. 15/276,455 filed Sep. 26, 2016; Ser. No. 12/069,986 filed Feb. 13, 2008, and Ser. No. 16/141,335 filed on Sep. 25, 2018, each of which is incorporated herein by reference in its entirety.

BACKGROUND

The field of the embodiments disclosed herein includes distributed, replicated data systems. Some distributed data systems may define logical constructs known as zones. Each such zone may comprise a server tasked with executing received commands by writing to and reading from the metadata service (hereafter, MDS) of its zone. Many systems offer such metadata services via a single server. Read commands may optionally be configured to bypass the server in applications where read-consistency can be sacrificed for improved performance. When multiple servers are present in each zone for failover purposes, an election must be made to ensure that only one of the multiple servers in each zone is designated to execute a given command at any time, although different commands may have different designated servers. In such a case, logic is provided to elect a new server that is allowed to write when it is believed that the current write-enabled server has crashed. However, it may be difficult to reliably distinguish between a crashed server and a slow server. Indeed, when a periodic heartbeat signal indicating the continued normal operation of the server is not received within the expected time frame, the server may have indeed crashed, may be simply slowed down or communications with the server may be delayed or impossible due to temporary network latency issues or other reasons. In such a case, if a new server is programmatically enabled to write and the old server comes back to life for any reason, there may now be two servers enabled to execute the same commands by writing to the backend storage. As a consequence, data integrity can no longer be guaranteed, as two servers are now independently executing the same command, potentially resulting in data corruption.

Therefore, some distributed systems require a human to manually confirm the death or non-operation of the first server before enabling a second sever to write to the backend data store. This confirms that the server that was believed to be dead is actually dead, thereby preventing the existence of two active writers within the same zone at the same time. Such a human confirmation is not optimal, as no data can be written until a human manually confirms (and thereby deactivates) the current write-enabled server.

DETAILED DESCRIPTION

Definitions

Distributed system: A distributed system comprises a collection of distinct, computing and/or storage processes and/or devices that may be spatially separated, and that may communicate with one another through the exchange of messages or events.

Replicated State Machine: A replicated state machine approach is a method for implementing a fault-tolerant service by replicating servers and coordinating client interactions with server replicas. These state machines are "replicated" since the state of the state machine evolves in an ordered fashion identically at all learners. Replicas of a single server are executed on separate processors of a distributed system, and protocols are used to coordinate client interactions with these replicas. One example and implementation of a replicated state machine is a deterministic state machine (DSM) that advances its state in a deterministic manner.

Proposers: According to one embodiment, proposers are processes that are configured and enabled to suggest proposals, some of which may be configured to mutate data.

Acceptors: According to one embodiment, acceptors are processes that are configured to participate in deciding on the order of proposals made by proposers. According to one embodiment, only when a majority of acceptors have determined that a proposal takes a particular place in the global sequence of agreements (further described below) does it become an agreement (e.g., an agreed-upon proposal). Acceptors, according to one embodiment, may be configured to only participate in deciding on the order of agreements and do not reason/care about the underlying contents of the agreements (as described herein, the agreement's value is opaque to the Distributed Coordination Engine, also described below). Acceptors may be configured as application-independent entities.

Learners: According to one embodiment, learners learn of agreements made between the proposers and acceptors and apply the agreements in a deterministic order to the application through their output proposal sequence. In one embodiment, an agreement identity is provided, as is a persistent store that, for each replicated state machine, allows a sequence of agreements to be persistently recorded. Each proposal is guaranteed to be delivered at least once to each learner in a particular membership.

The Hadoop-Compatible File System (HCFS) namespace is a hierarchy of files and directories. Hadoop is an open source, Java-based programming framework that supports the processing and storage of extremely large data sets in a distributed computing environment. It is part of the Apache project sponsored by the Apache Software Foundation. Files and directories are represented on the NameNode by Modes. Modes record attributes or metadata such as permissions, modification and access times, namespace and disk space quotas. The file content is split into large data blocks (typically 128 MB), and each data block of the file is independently replicated at multiple DataNodes (typically three). One implementation of HCFS is the Hadoop Distributed File System (HDFS). The NameNode is the metadata service of HDFS, which is responsible for tracking changes in the namespace. The NameNode maintains the namespace tree and the mapping of blocks to DataNodes. That is, the NameNode tracks the location of data within a Hadoop cluster and coordinates client access thereto. Conventionally, each cluster has a single NameNode. The cluster can have thousands of DataNodes and tens of thousands of HDFS clients per cluster, as each DataNode may execute multiple application tasks concurrently. The Modes and the list of data blocks that define the metadata of the name system are called the image. NameNode keeps the entire namespace image in Random Access Memory (RAM).

The roles of proposers (processes who make proposals to change the state of the namespace to the membership), acceptors (processes who vote on whether a proposal to change the state of the namespace should be agreed by the membership) and learners (processes in the membership who learn of agreements that have been made) are defined in, for example, the implementation of the Paxos algorithm described in Lamport, L.: The Part-Time Parliament, ACM Transactions on Computer Systems 16, 2 (May 1998), 133-169, which is incorporated herein in its entirety. According to one embodiment, multiple nodes may be configured to carry out each of the roles. A Distributed Coordination Engine (also referred to as DConE) may allow multiple learners to agree on the order of events submitted thereto by multiple proposers with the aid of multiple acceptors to achieve high availability. To achieve reliability, availability, and scalability, multiple simultaneously-active NameNodes (which may be generically referred to herein as MDSs) may be provided by replicating the state of the namespace on multiple nodes with the requirement that the state of the nodes on which the namespace is replicated is maintained consistent between such nodes. In one embodiment, however, only one MDS is present in each zone, as discussed hereunder.

This consistency between NameNodes in different zones may be guaranteed by the DConE, which may be configured to accept proposals to update the namespace, streamline the proposals into an ordered global sequence of updates and only then allow the MDSs to learn and apply the updates to their individual states in the specified, agreed-upon order. Herein, "consistency" means One-Copy Equivalence, as detailed in Bernstein et al., "Concurrency Control & Recovery in Database Systems", published by Addison Wesley, 1987, Chapters 6, 7 & 8, which is hereby incorporated herein in its entirety. Since the NameNodes start from the same state and apply the same deterministic updates in the same deterministic order, their respective states evolve identically over time to maintain consistency.

According to one embodiment, therefore, the namespace may be replicated on multiple NameNodes (or, more generally, metadata servers or MDSs) provided that a) each MDS is allowed to modify its namespace replica, and b) updates to one namespace replica must be propagated to the namespace replicas on other MDSs in other zones such that the namespace replicas are maintained consistent with one another, across MDSs and across zones.

Figure 1:
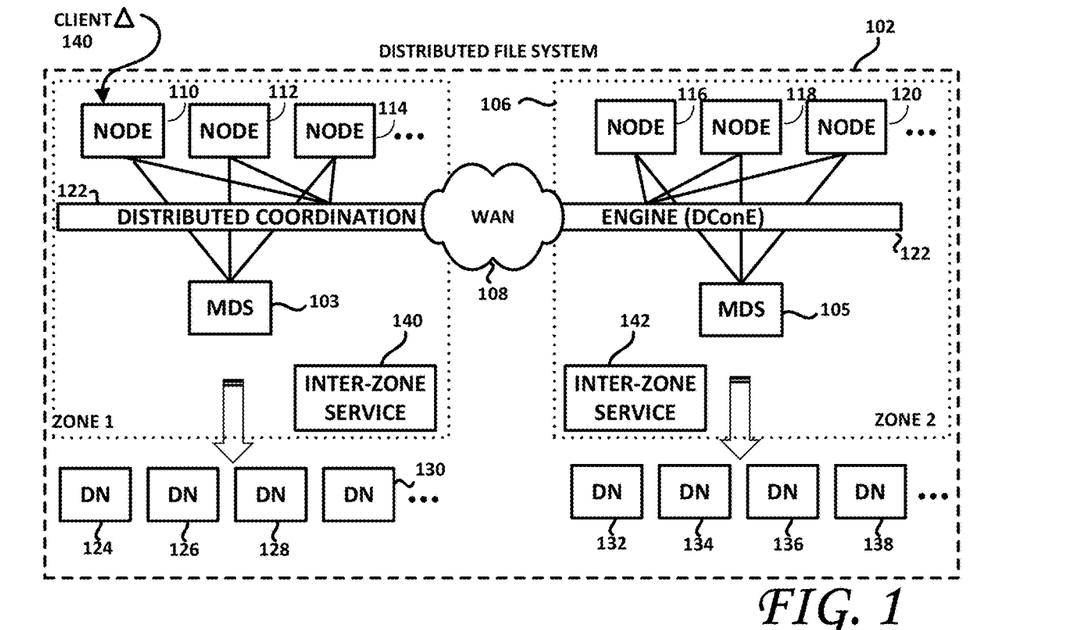
FIG. 1 is a diagram of a distributed replicated data system within which embodiments may be practiced.

FIG. 1 shows a cluster running a single distributed file system 102 spanning different geographically (or otherwise) separated zones. The distributed file system may, for example, incorporate aspects of HDFS. Each of the DataNodes (shown as "DN" in FIG. 1) may be configured to communicate (through a DataNode-to-server remote procedure call (RPC) protocol) only within their own zone. That is, the DNs of zone 1 may only communicate with the nodes (servers) 110, 112, 114 . . . of zone 1 (or nodes adjacent to zone 1) and the DNs 132, 134, 136, 138 . . . of zone 2 may only communicate with nodes (servers) 116, 118, 120 . . . of zone 2 (or servers adjacent to zone 2). In one embodiment, only one metadata service (MDS) storing a replica of the namespace may be present in each zone such as shown at MDS 103 for zone 1 and MDS 105 for zone 2. The nodes (servers) of each zone, in turn, communicate only with the MDS of their respective zone. In this manner, nodes 110, 112, 114 . . . communicate with MDS 103 and nodes 116, 118, 120 . . . of zone 2 communicate only with MDS 105. The MDSs of both zones 1 and 2 may coordinate with each other using one or more (e.g., an odd number such as 3, for High Availability (HA)) inter-zone servers 140, 142 to maintain the state of the namespace consistent throughout the different zones of the distributed filesystem 102 by streaming changes to the namespace across the WAN 108 between zones. Those changes may be received by a server (node) in the other zone, whereupon that server writes the changes locally to the backend storage of that zone, thereby enabling all reads and writes to be performed as local operations, thereby eliminating the need for cross-zone security.

The DConE process 122 may be configured to guarantee that the same deterministic updates to the state of the namespace are applied in the same deterministic order on all MDSs in all zones. In one embodiment, the DConE process 122 may be embedded in the MDS of each zone. That deterministic order may be defined by a Global Sequence Number (GSN). Therefore, a significant role of the DConE process 122 is to process agreed-upon proposals to modify or otherwise update the state of the namespace replicas according to commands received by the servers in each zone from HDFS clients and transform them into a globally-ordered sequence of agreements, indexed by the GSN. The servers (or nodes, as the terms may be used interchangeably) may then sequentially apply the agreements from that ordered sequence, which generates updates to the state of the replica of the namespace in their zone. The GSN may be configured as a unique monotonically increasing number. However, the GSN may be otherwise configured, as those of skill in this art may recognize. In this manner and through the sequential execution of the ordered (though the GSN mechanism) set of agreements generated by the DConE process 122, and through the streaming of changes in each zone to all of the other zones, the state of the replica of the namespace stored in each of zones is brought to or maintained in consistency. As MDSs start from the same state, this ordered application of updates ensures consistency of the replicas across zones, in that snapshots thereof on MDSs having processed the agreements at the same GSN are identical, both within and across zones.

The metadata in the replicas of the namespace maintained by the MDSs may be coordinated instantaneously (or nearly so, accounting for bandwidth and latencies inherent in the network), as the DConE process 122 delivers the agreements and as changes are streamed between zones. Likewise, all file system data is also automatically replicated across the distributed file system. In such a manner, consistent, continuous data replication takes place between file systems in (e.g., but not limited to, Hadoop) clusters. Client applications may be configured to interact with a virtual file system that integrates the underlying storage across multiple zones. When changes are made to files in one zone, those changes are replicated consistently to the other zones. One embodiment may comprise a software application that allows Hadoop deployments to replicate HCFS data between (e.g., Hadoop) clusters that are running different, even incompatible versions of Hadoop such as, for example, CDH, HDP, EMC Isilon, Amazon S3/EMRFS and MapR. It is also possible, according to one implementation, to replicate between different vendor distributions and versions of Hadoop.

Advantageously, embodiments may provide a virtual file system for Hadoop, compatible with all Hadoop applications, a single, virtual namespace that integrates storage from different types of Hadoop, a globally-distributed storage mechanism, and WAN replication using active-active replication technology, delivering single-copy consistent HDFS data, replicated between far-flung data centers.

According to one embodiment, some or all of the functionality described herein may be carried out within a server or servers adjacent to MDS, at a higher level in the distributed filesystem stack. In this manner, rather than working deeply at the NameNode level, one embodiment may be configured to operate as a proxy application to the distributed file system.

In the ordered global sequence of agreed-upon proposals, (issued from a Deterministic State Machine (DSM) or from some other source), some commands in a sequence of commands might be dependent on others. Dependent commands must be executed in the correct order. For example, consider commands A, B and C, in which command B depends on command A and in which command C depends on commands B and A. For load balancing or other purposes, it may be desired to spread the execution load of such commands across several servers or nodes within a zone. For example, node 1 may be assigned execution of command A, node 2 may be assigned execution of command B and node 1 may be assigned to execute command C. In order for node 2 to execute command B, it must be made aware that node 1 has finished executing command A. Likewise, the same is true again for node 1 when executing command C, as it will need verification that node 2 has finished execution of command B. This approach risks the introduction of significant delays in processing client change requests (i.e., commands) when delays in inter-node communication occur.

As set forth above, execution of dependent commands must be delayed until the command or commands from which they depend have been executed. Independent commands may be executed in parallel. In case of failure, a command might be re-executed, but under no conditions may a sequence of commands be re-executed. That is, each command is idempotent (will produce the same result if executed once or multiple times), but the execution of a sequence of more than one command is not idempotent, in that re-execution of the same sequence will not produce the same result. Therefore, although each command may be individually executed more than once, a sequence of such commands may not.

For scalability and high availability, there may be multiple servers executing commands and each server within a zone may execute multiple independent commands in parallel. Even though each node receives the entire ordered global sequence of commands, each command in the global sequence should only be executed by a single node. Herein, nodes or servers are deemed unreliable (in that they are subject to failure and may or may not recover) and are configured to communicate with each other, as described above.

One embodiment is a computer-implemented method of writer pre-selection (i.e., the pre-selection of a (in one embodiment, preferred) node that is to execute commands configured to update the state of the namespace) that achieves scalability, high-availability and ensures prompt and reliable execution of the constituent commands of the ordered global sequence, while maintaining the safety of preventing re-execution of sequences of commands.

The Writers List

Figure 2:
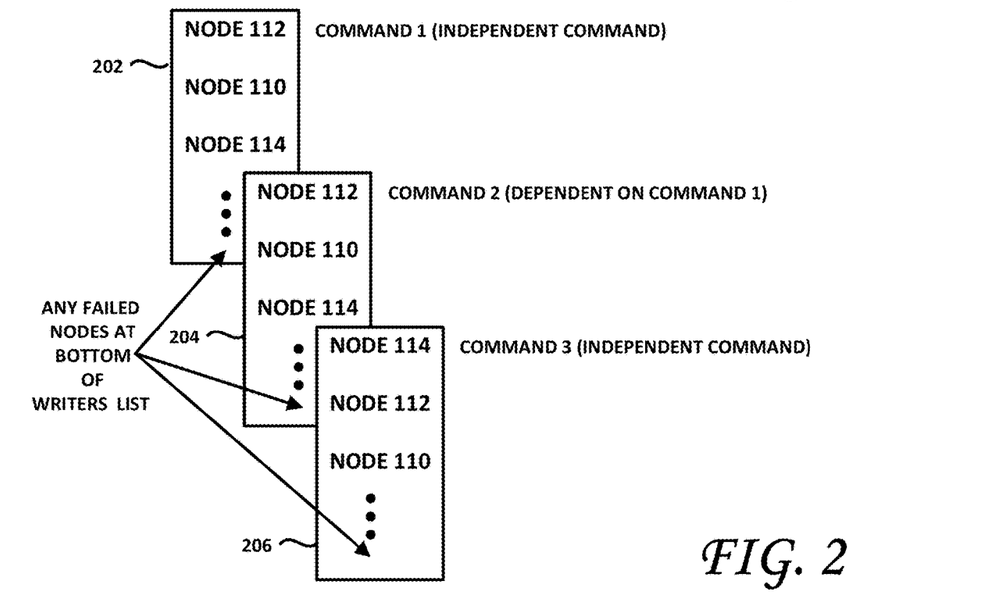
FIG. 2 is a diagram showing writers lists and aspects of the present computer-implemented methods, according to embodiments.

According to one embodiment, and as shown in FIG. 2, prior to insertion into the ordered global sequence generated by the DConE 122, each command or command may be associated with a list of nodes (servers) to execute the command (in the consensus case, an agreement), ordered according to execution preference. In one embodiment, this list of nodes may be ordered such that the nodes appear in the list in the order of preference for execution. This ordered list of nodes is also referred to herein as the writers list 202. Each node, according to one embodiment, may be configured to only execute those commands in which it is the first node in the received ordered writers list. According to one embodiment, if the first node in the writers list becomes non-operational (e.g., an expected heartbeat signal is not timely received), the next operational node or server in the ordered writers list 202 may be designated as the node to execute the command. Thereafter, and in real-time or near real-time, the nodes disseminate, to all or a predetermined number of the nodes, information that includes which commands they executed which, in time, enables all nodes (including itself) to be apprised of all already-executed commands.

As shown in FIG. 2, command 1 is an independent command and is associated with writers list 202, in which server 112 is the first-listed node. Therefore, node 112 is the preferred server to execute command 1. If node 112 fails for any reason, before having executed command 1 or after execution but before it can disseminate the fact that it has executed command 1, then execution of command 1 falls back to node 110 (the next-listed node in the writers list 202) and thereafter to next-listed node 114 should server 110 fail. Any known failed nodes are relegated to the bottom of the writers lists that are generated (or otherwise accessed) for subsequent commands. Since command 2 is dependent upon the execution of command 1, writers list 204 is associated therewith, which writers list is identical to writers list 202. Command 3, being an independent command, may have a different writers list 206 associated therewith. Note that the same writers list as 202 and 204 may have been associated with command 3, but load balancing and/or other considerations may have recommended a different writers list for that command.

In further detail, according to one embodiment, processes placing the commands into the ordered global sequence of agreements may learn of suspected failing nodes and failed nodes and may keep track of the operational status of all of the nodes. For each new execution of client commands, the writers list may, according to one embodiment, include a ordered sequence of preferred operational nodes that should execute the command followed by, in one embodiment, failed, failing or suspicious nodes. Therefore, when a node fails, or is suspected of failing, such node will be pushed to or toward the bottom of the writers list.

In one embodiment, the operational nodes in the writers list may be ordered such that dependent commands will preferably receive same writers list (such as shown at 202 and 204 in FIG. 2) to reduce inter-node execution dependencies and may be ordered such that all nodes have approximately the same distribution of positions. Indeed, dependent commands will preferably receive same writers list to reduce inter-node execution dependencies and consequent latencies. This is because the node that is selected to execute an independent command is the node that is best positioned to execute the command(s) that are dependent thereon, which avoids the latency inherent in waiting for updates to propagate to other nodes for execution of dependent command(s). According to one embodiment, all nodes may have approximately the same distribution of positions within the generated writers lists, to evenly distribute the compute load across all available (that is, operational) servers or nodes. Other considerations may, in some situations, dictate a different ordering of the nodes within the writers list that modifies the above-listed preferences.

Node Failure

Figure 3:
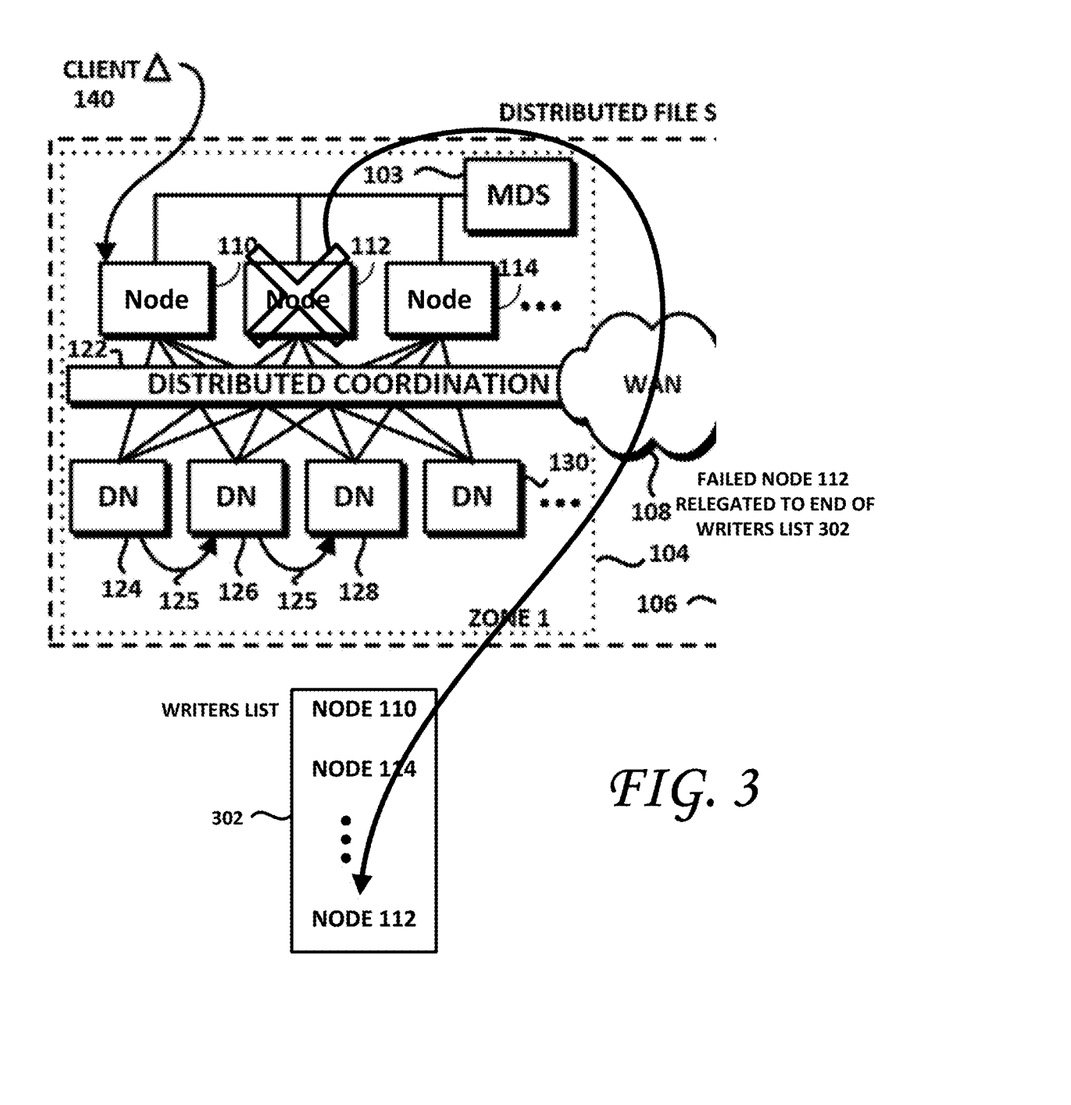
FIG. 3 is a diagram showing writers lists and aspects of the present computer-implemented methods in the presence of a failed (or suspected failed) node, according to embodiments.

Servers are assumed to be failure-prone. A failure of a node means that it will stop executing commands, it will stop informing others about its execution state, or both. Other nodes have no way to distinguish between these two cases (no way to distinguish between slow, non-reporting or failed nodes). According to one embodiment, when a node fails, its position within the writers list changes, at least for all new or subsequent commands. Indeed, a perceived node failure results, according to an embodiment, in the node being pushed back (i.e., away from the top, toward the bottom) in the writers list for new or subsequent commands, so eventually the system will stop producing compute loads for that perceived failed node until the server recovers and signals that it has returned to nominal operational status. In FIG. 3, node 112 has failed or is suspected of having failed. When a new command is issued, node 112 will be relegated to the bottom or near the bottom of the writers list 302 associated with the new command.

The commands which were previously assigned to be executed by the failed node as the preferred writer, which were not yet executed, will get stuck from other nodes' point of view (together with any commands depending on them). According to an embodiment, if an external entity reliably confirms that the suspected failed node is not operational and will not suddenly start operating again, these stuck commands may be handled, according to an embodiment, in one of two ways:

1) Dead Node Declaration

Figure 4:
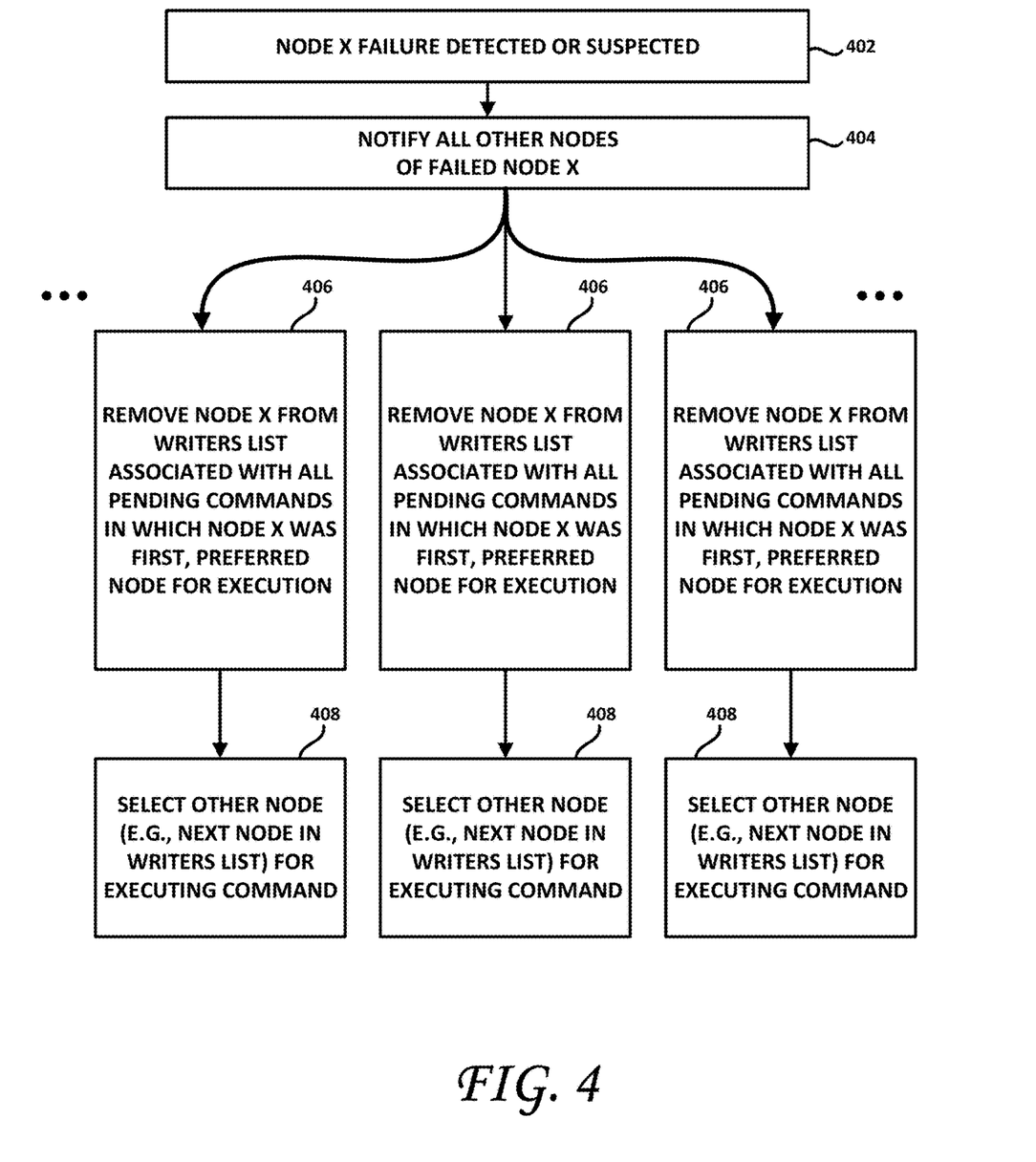
FIG. 4 is a flowchart showing aspects of a computer-implemented method according to an embodiment.

As shown at 402 in FIG. 4, upon failure of a node X, all other nodes may be notified (in one embodiment, by the DConE process embedded in the MDS) of the failure of node X, as shown at 404. Upon receiving such notification, the nodes, according to an embodiment and as shown at 406, may remove node X in the writers list from all pending commands which had node X as the first, preferred node for execution purposes, as shown in FIG. 4, and will cause the command to be executed by another (in one embodiment, the next) node in the writers list as shown at 408, now that node X has been removed from the top of the writers list.

2) Replacement Node

Figure 5:
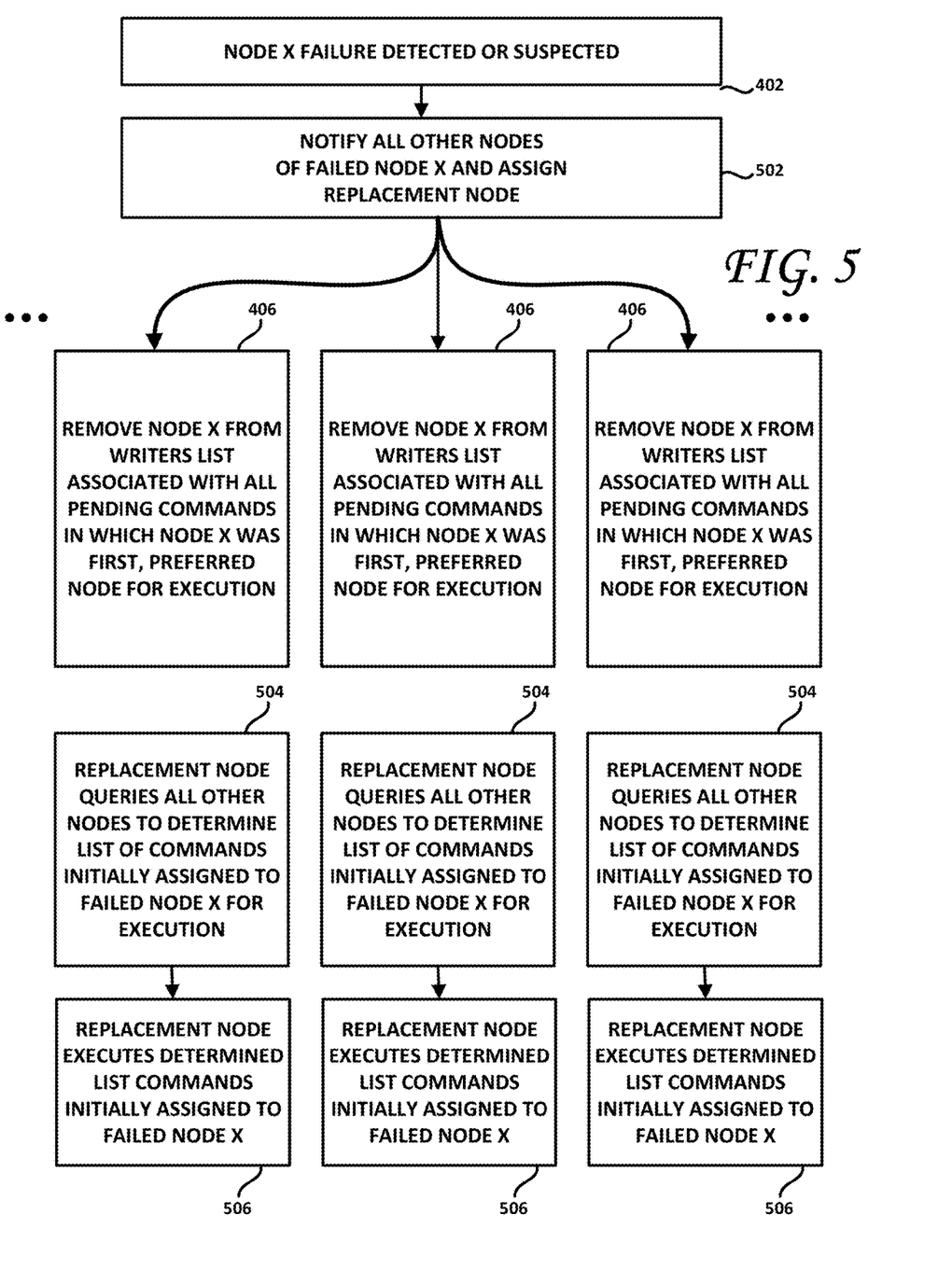
FIG. 5 is a flowchart showing aspects of a computer-implemented method according to an embodiment.

Similarly as shown in FIG. 5, upon failure of a node X as shown at 402, all other nodes may be notified (in one embodiment, by the DConE process embedded in the MDS of the zone that includes failed node X) of the failure of node X, as shown at 502. Upon receiving such notification, the nodes, according to an embodiment and as shown at 406, may remove node X in the writers list from all pending commands which had node X as the first, preferred node for execution purposes. According to one embodiment, a single other, replacement operational node may be designated to take over the commands previously assigned to the failed node X for execution. This newly-designated replacement node could be a new node (server), in which case the new node may query the other nodes as shown at 504 to determine what commands were assigned to node X for execution, so that it may execute them instead of the failed node X, as suggested at 506.

Execution Status Dissemination

Each node disseminates information about commands it executed for two reasons:

(1) To unblock any dependent commands assigned to other MDSs, and (2) To prevent re-execution of a non-idempotent command in case of node failure.

Note that, according to one embodiment, it is not necessary to prevent immediate repetition of the execution of a command, absent intervening dependent commands, if the command is idempotent. In particular, embodiments do not need and do not defend against a server failing after executing a command but before dissemination of that information. Instead, commands that are not idempotent, according to an embodiment, are revised to be equivalent in outcome but idempotent.

The manner in which such dissemination occurs need not be strictly conscribed. However such dissemination occurs, it should satisfy the following constraints or properties:

To satisfy reason (1), the dissemination should occur quickly, i.e., in near-real time.

The act of disseminating information about executed command should be persistent and guarantee delivery. In this manner, even nodes that have failed and that eventually return to operational status can and will eventually learn the dissemination information.

The act of disseminating information about executed commands should be operational as long as the disseminating node (the node that executed the command about which the information is being disseminated) is operational.

Each node should be able to acknowledge the delivery of such dissemination information to other nodes, for continuity guarantee.

One embodiment includes a deterministic finite state machine with a single proposer, a single acceptor (the writing node itself) and many learners (other nodes) that learn of the outcome of the command. In such an embodiment, each executor server (node) has its own deterministic finite state machine. Such a finite state machine may then function as the mechanism by which inter-node information dissemination may take place, as discussed hereunder.

Continuity Guarantee

Even if a node fails, the execution status of any command must not become lost, except as allowed by idempotence. Suppose a command C is executed. Before sufficiently disseminating this information, a command D that is dependent on C is executed. At this point, even if C is idempotent, re-executing it violates safety but can happen because of the insufficient dissemination. For example, a node may fail after having executed a sequence of commands but before it successfully disseminates the "command completed" updated status thereof. Thereafter, another node may erroneously re-execute the sequence of commands, which would violate safety. Therefore, according to an embodiment, to tolerate failure of N nodes, a node must, according to one embodiment, confirm that dissemination to at least N+1 nodes (including itself) has succeeded before executing any command that is later in the sequence of commands and dependent on the results of that command. Different policies and risk tolerance will determine the number of nodes from which dissemination must be confirmed.

The roles of participants in the Paxos consensus algorithm, include proposers (processes who propose commands to change the state of the namespace to the membership), acceptors (processes who vote on whether the proposed command to change the state of the namespace should be agreed by the membership) and learners (processes in the membership who learn of agreements that have been made). According to one embodiment, the nodes may be configured to carry out any one of these roles at any given time. As noted above, a DConE process may allow multiple learners to agree on the order of events submitted to the engine by multiple proposers with the aid of multiple acceptors to achieve high availability.

Therefore, under Paxos, in the case in which there are multiple acceptors, a command proposed by a proposer will advance as long as most (i.e., a majority) of the multiple acceptors do not fail. However, according to one embodiment, in the special case in which there is only one acceptor node, a proposed command may advance (i.e., take its place in the ordered sequence of agreements to be executed) without consulting the single acceptor node. A proposed command, therefore, may progress straight from a proposer in a deterministic state machine to an agreement to a learner, bypassing the (sole) acceptor. A Paxos-style consensus is, therefore, unnecessary in this case, as the proposer "knows" that it is not in conflict with itself.

Information about any executed command must be disseminated to all learners. In the case in which there is only one proposer node, that node both executes the command and necessarily learns the information about and the changed (e.g., from pending to executed) status of the command. This single proposer, therefore, effectively acts as a persistent pathway (to itself) for the dissemination of information regarding the executed command. In one embodiment, a persistent pathway to the dissemination of information regarding executed commands may also be established to all learner nodes. The proposer, according to an embodiment, may have a deterministic state machine (for which it is the only proposer) associated therewith that allows all learners to learn of information concerning executed commands. Each of the other nodes also have a deterministic state machine (that is active when they are the sole proposer) that allows all other nodes, in their role as learners, such information and to change their state accordingly.

Figure 6:
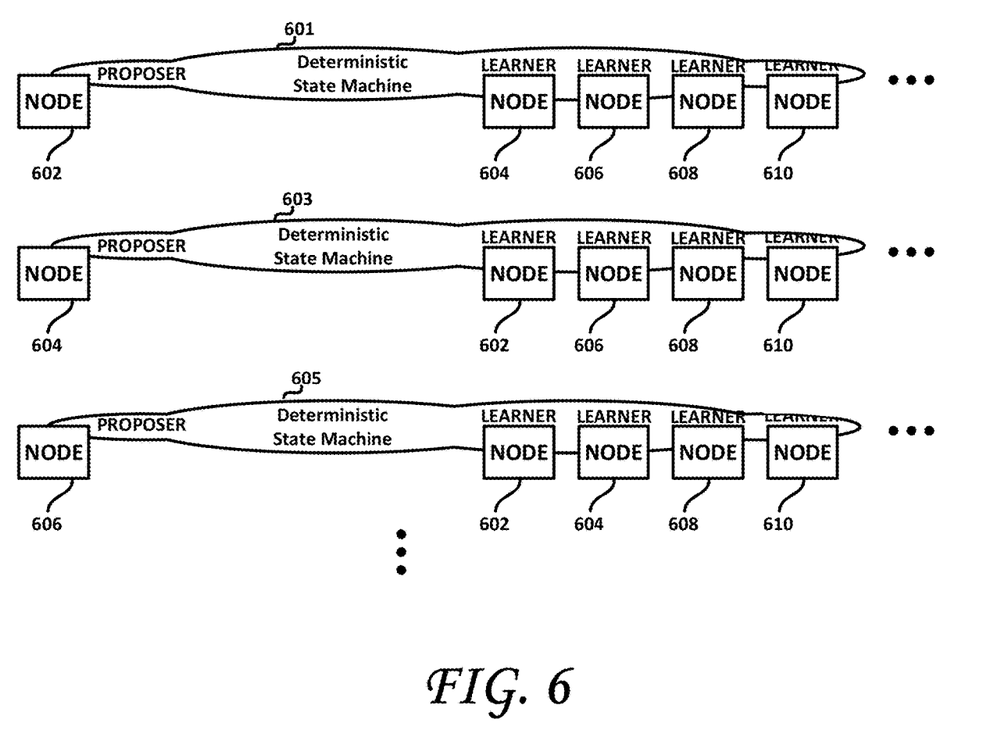
FIG. 6 is a diagram illustrating distributed state machines spanning single proposers and multiple learners, according to an embodiment.

In one embodiment and as shown in FIG. 6, therefore, each node may have a deterministic state machine (DSM) for which it is the only proposer and for which every other node is a learner. As shown, node 602 has a DSM 601 for which it is the only proposer and for which all other nodes 604, 606, 608, 610 . . . are learners. Likewise, node 604 has a DSM 603 for which it is the only proposer and for which all other nodes 602, 606, 608, 610 . . . are learners. Similarly, node 606 has a DSM 605 for which it is the only proposer and for which all other nodes 602, 604, 608, 610 . . . are learners, and so on. In this case, the DSMs 601, 603, 605 . . . act as pre-established and persistent message queues, which significantly reduces inter-node traffic and which reduces the latency inherent in point-to-point communications between nodes.

Optional Writers List Optimization

Figure 7:
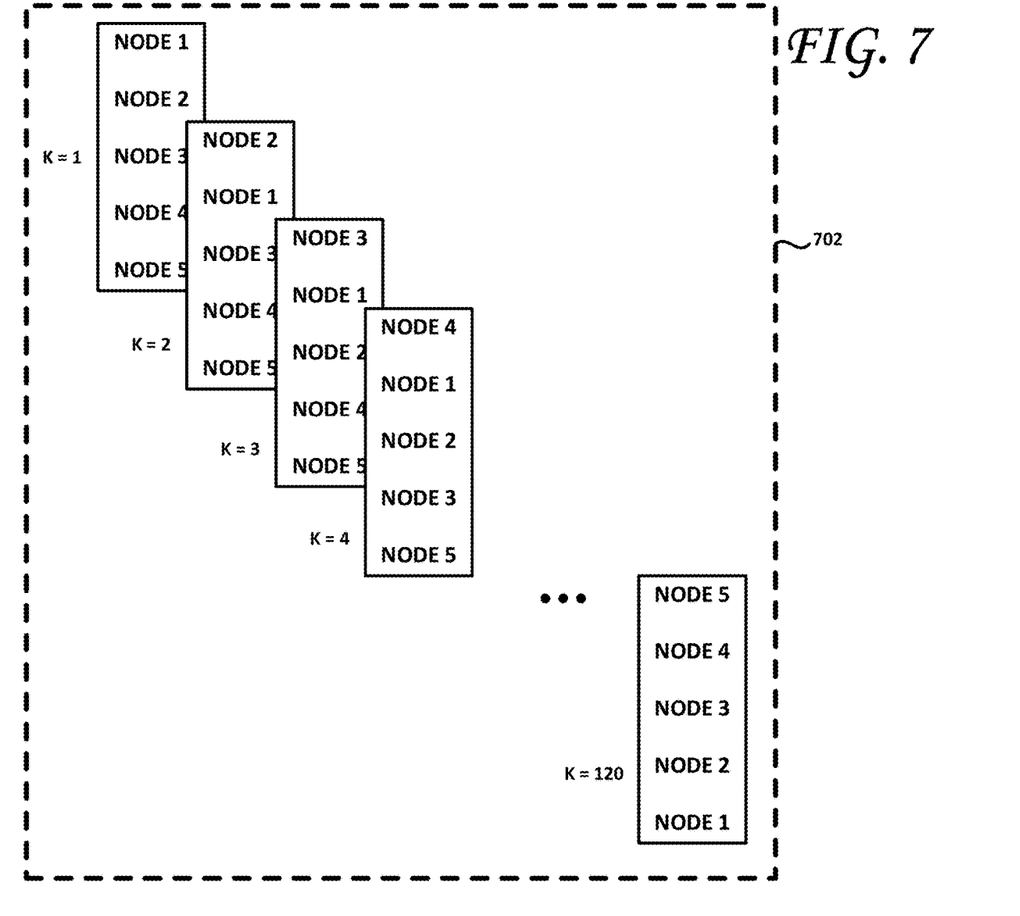
FIG. 7 is a diagram showing pre-generated and indexed writers lists, according to an embodiment.

As noted above, for each new command of client commands, the writers list may, according to one embodiment, include a preferred ordered sequence of operational nodes that should execute the command followed by, in one embodiment, failed, failing or suspicious nodes. In this manner, the preferred operational node will be at the top of the writers list, followed by an ordered list of fallback operational nodes that are to execute the command should the node at the top of the list turn out to be non-operational, followed by, at the end of the list, known currently non-operational nodes. When a node fails, or is suspected of failing, therefore, it will be pushed toward the bottom of the writers list. According to one embodiment, if the list of the available nodes is known to all participants in advance, then it becomes possible to generate in advance, a separate and unique writers list for each possible permutation of nodes. For example, if there are n nodes, then n! distinct writers lists may be pre-generated and numbered (indexed). These pre-generated and indexed writers lists may then be pre-distributed (i.e., in advance of processing commands) to each of the nodes as a list of writers lists as shown in FIG. 7 at 702. In the illustrative example shown in FIG. 7, there are five available or potentially available nodes to which commands may be assigned for preferred execution. There being five available nodes, there are 120 different orderings of these five nodes as shown in FIG. 7, and each of these unique ordering of nodes may constitute a writers list, with each writers list being identified by an index k=1 through k=120. Even with a large number of nodes, such simple writers lists would not take up much storage space at each of the nodes nor would the transmission of such writers lists be prohibitive in terms of bandwidth—especially since such dissemination would only have to be carried out one time.

Thereafter, instead of sending a writers list with each command to be executed detailing the preferred node to execute the command (the first-listed nodes), followed by fallback nodes and non-operation, failed or suspected failing nodes at the bottom, a simple index k into the pre-generated and pre-distributed list 702 of writers lists may accompany the command to be executed. Sending an index k into the list 702 of writers list rather than a complete writers list significantly reduces traffic overhead and provides a ready mechanism to specify the preferred node or server to execute any given command. Upon receiving the index k, only that node at the top of the writers list that corresponds to the received index will execute the command. The selection of the index k into the list of writers lists may, according to one embodiment, take into account a number of factors including, for example, load balancing, command dependencies, geographic proximity, network conditions and network latencies, as well as a knowledge of which nodes are currently non-operative, failing or suspected of failing. Other factors may also be considered in selecting the index k. When the index k for the command to be executed is transmitted, the selected index k will correspond to a list in which, at the very least, non-operative, failing or suspected of failing nodes appear at the bottom.

Figure 8:
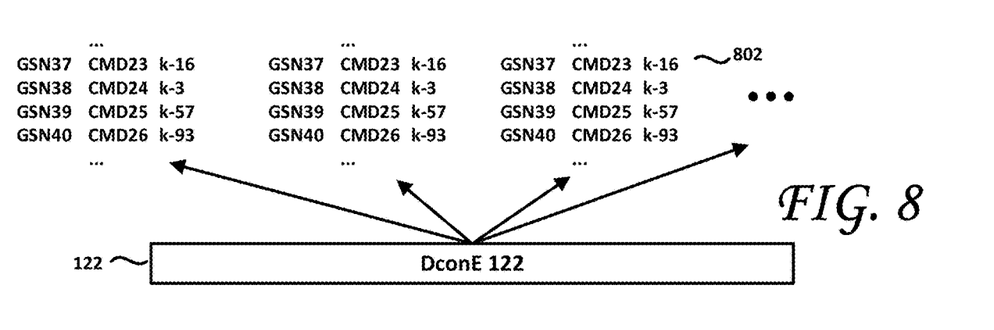
FIG. 8 is a diagram showing the pre-generated and indexed writers lists, according to an embodiment.

As suggested in FIG. 8, therefore, the DConE process 122 (which may be embedded in the MDS of each zone) may broadcast to all nodes, along with the GSN and the command to be executed, the index k of the writers list, which specifies a unique writers list which, in turn, specifies the preferred node (and fallback, lower-listed nodes) that are to execute the command, as suggested at 802.

Figure 9:
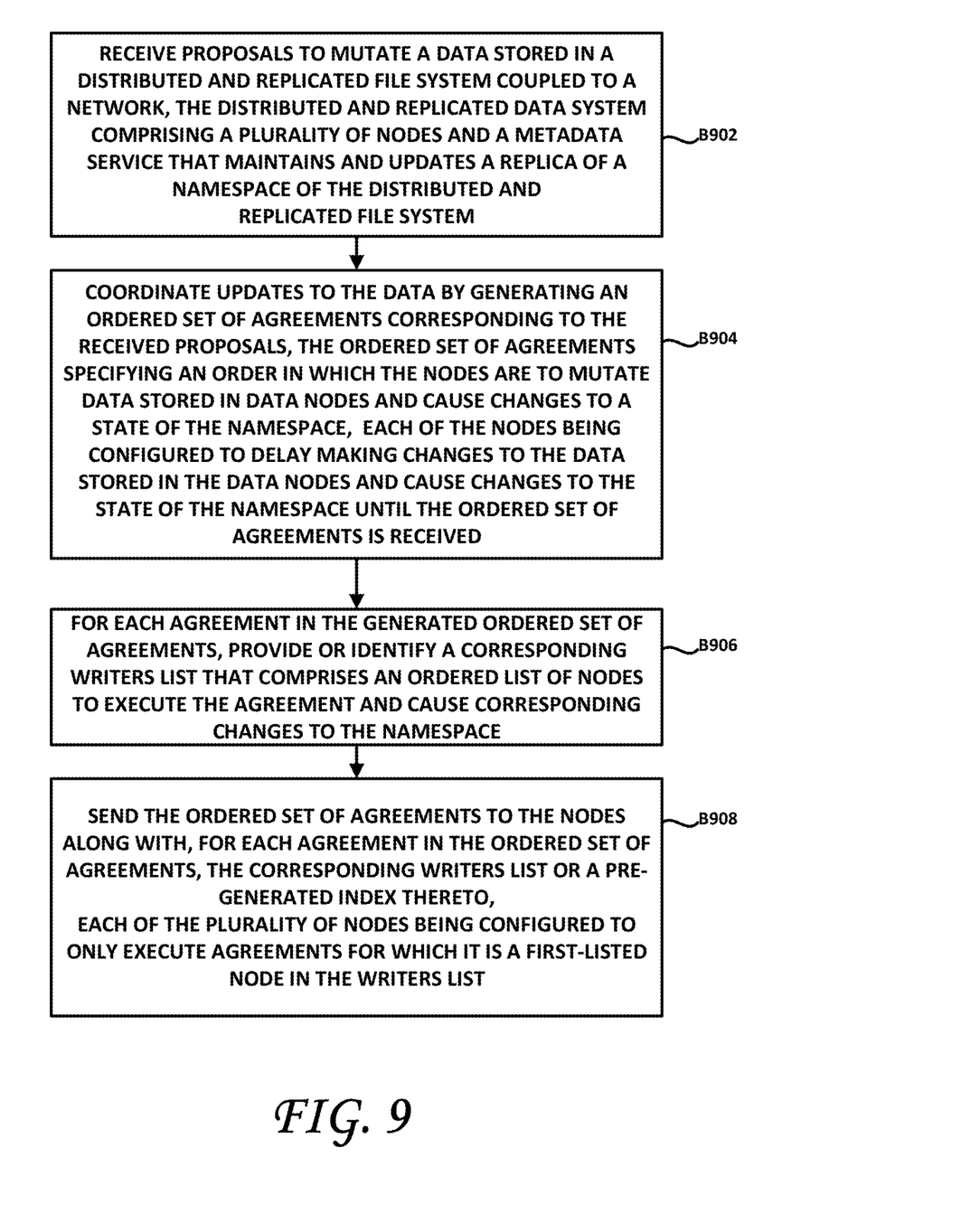
FIG. 9 is a flowchart of a computer-implemented method according to one embodiment.

FIG. 9 is a flowchart of a computer-implemented method according to one embodiment. As shown therein, block B902 calls for receiving proposals to mutate a data stored in a distributed and replicated file system coupled to a network, the distributed and replicated data system comprising a plurality of servers (also called nodes herein) and a metadata service that is configured to maintain and update a replica of a namespace of the distributed and replicated file system. Block B904 may then be executed, in which updates to the data may be coordinated by generating an ordered set of agreements corresponding to the received proposals, the ordered set of agreements specifying an order in which the nodes are to mutate the data stored in data nodes and cause corresponding changes to the state of the namespace. Each of the nodes may be configured to delay making changes to the data and causing changes to the state of the namespace until the ordered set of agreements is received. As shown at B906, for each agreement in the generated ordered set of agreements, a corresponding writers list may be provided or identified that comprises an ordered list of nodes to execute the agreement and cause corresponding changes to the namespace. As shown at B908, the ordered set of agreements may then be sent to the plurality of nodes along with, for each agreement in the ordered set of agreements, the corresponding writers list or a pre-generated index thereto. Each of the plurality of nodes may be configured, according to one embodiment, to only execute agreements for which it is a first-listed node on the writers list.

According to a further embodiment, providing may comprise generating the writers list for at least some of the generated ordered set of agreements. Providing may also comprise selecting from among a plurality of pre-generated writers lists. The writers list may comprise an ordered list of preferred operational nodes toward the top of the writers list and may comprise a list of failed or suspected failed nodes towards the bottom of the writers list. The act of providing may further comprise providing or identifying the same writers list for a second proposal that is dependent upon a prior execution of a first proposal than is provided for the first proposal. The computer-implemented method may further comprise enabling a next-listed node in the writers list to execute the agreement when the first-listed node in the writers list has failed or is suspected of having failed. A predetermined replacement node may also be enabled to execute the agreement when the first-listed node in the writers list has failed. Each node or server having executed an agreement may be further configured to disseminate information relating the executed agreement to each of the plurality of nodes. Disseminating may further comprise guaranteeing delivery of the disseminated information. Upon a node executing an agreement, a deterministic state machine may be updated with information relating to the executed agreement, the deterministic state machine being coupled to each of the other nodes and serving as a persistent messaging service between the plurality of nodes. The computer-implemented method may further comprise learning of failing or failed nodes and placing the failed or failing node at the bottom of any generated writers list. In one embodiment, an indexed writers list may be pre-generated for each of all possible combinations of orderings of the plurality of nodes and distributed to each of the plurality of nodes. The method may then comprise selecting one of the indexed writers lists, and sending the ordered set of agreements to the plurality of nodes along with, for each agreement in the ordered set of agreements, an index to a selected one of the pre-generated indexed writers lists.

Another embodiment is a network of nodes configured to implement a distributed file system. The cluster may comprise a plurality of data nodes, each configured to store data blocks of client files; a plurality of servers or nodes, each configured to read and/or mutate the data stored in the data nodes and cause corresponding updates to the state of a namespace of the cluster responsive to changes to the data blocks of client files; and a distributed coordination engine embedded in the metadata service that is configured to coordinate received proposals to mutate the data blocks by generating an ordered set of agreements corresponding to the received proposals, with the ordered set of agreements specifying the order in which the nodes are to make changes to the data stored in the data nodes and cause corresponding changes to the state of the namespace. The metadata service may be further configured, for each agreement in the generated ordered set of agreements, to provide a corresponding writers list that comprises an ordered list of nodes to execute the agreement and cause corresponding changes to the namespace and to send the ordered set of agreements to the plurality of nodes along with, for each agreement in the ordered set of agreements, the corresponding writers list or a pre-generated index thereto. In this manner, each of the plurality of nodes may be only enabled to execute agreements for which it is a first-listed node on the writers list.

Physical Hardware

Figure 10:
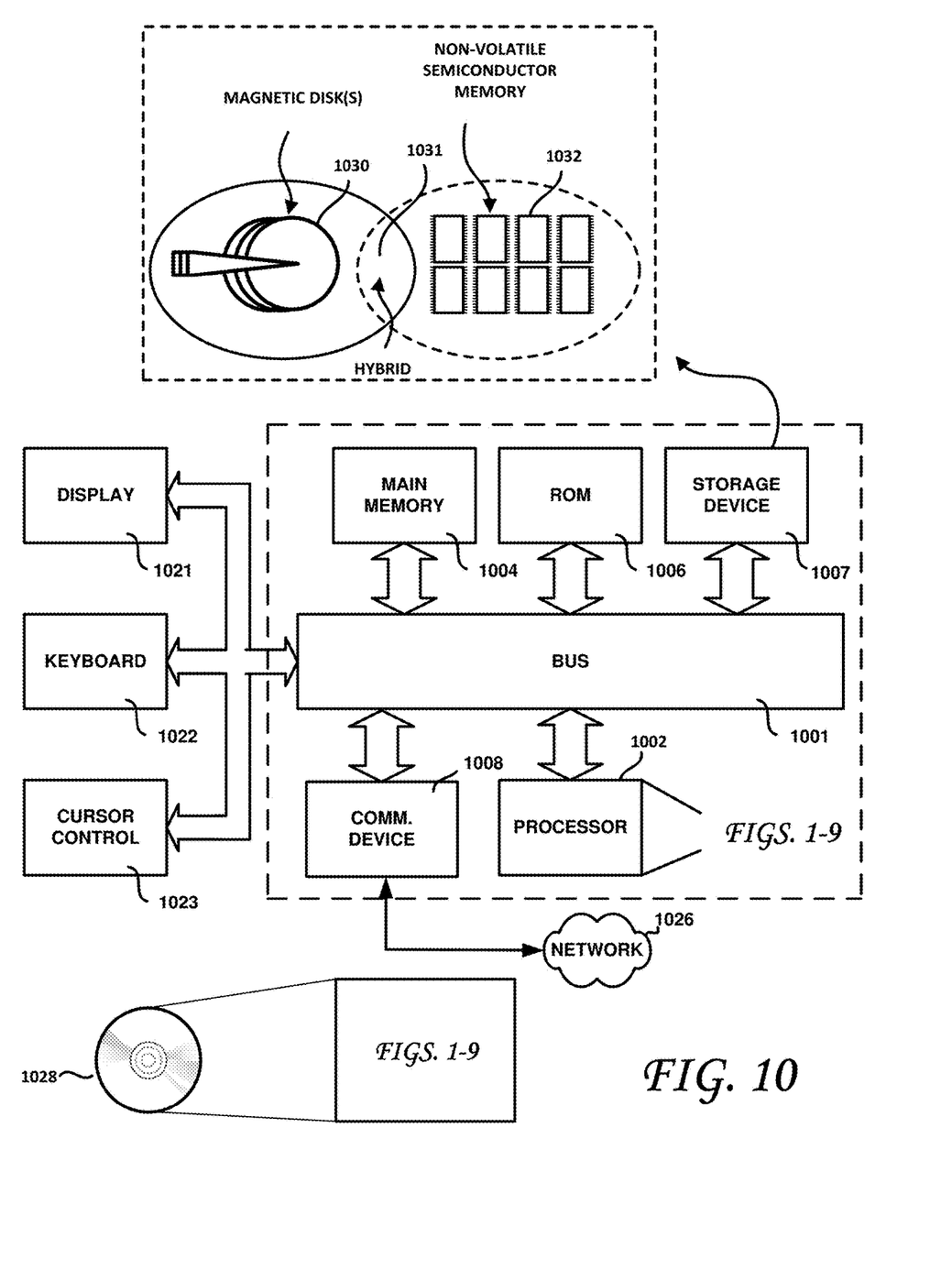
FIG. 10 is a block diagram of a computing device with which the embodiments shown and described herein may be practiced.

FIG. 10 illustrates a block diagram of a computing device with which embodiments may be implemented. The computing device of FIG. 10 may include a bus 1001 or other communication mechanism for communicating information, and one or more processors 1002 coupled with bus 1001 for processing information. The computing device may further comprise a random-access memory (RAM) or other dynamic storage device 1004 (referred to as main memory), coupled to bus 1001 for storing information and instructions to be executed by processor(s) 1002. Main memory (tangible and non-transitory, which terms, herein, exclude signals per se and waveforms) 1004 also may be used for storing temporary variables or other intermediate information during execution of instructions by processor 1002. The computing device of FIG. 10 may also include a read only memory (ROM) and/or other static storage device 1006 coupled to bus 1001 for storing static information and instructions for processor(s) 1002. A data storage device 1007, such as a magnetic disk and/or solid-state data storage device may be coupled to bus 1001 for storing information and instructions—such as would be required to carry out the functionality shown and disclosed relative to FIGS. 1-9. The computing device may also be coupled via the bus 1001 to a display device 1021 for displaying information to a computer user. An alphanumeric input device 1022, including alphanumeric and other keys, may be coupled to bus 1001 for communicating information and command selections to processor(s) 1002. Another type of user input device is cursor control 1023, such as a mouse, a trackball, or cursor direction keys for communicating direction information and command selections to processor(s) 1002 and for controlling cursor movement on display 1021. The computing device of FIG. 10 may be coupled, via a communication interface (e.g., modem, network interface card or NIC) 1008 to the network 1026.

As shown, the storage device 1007 may include direct access data storage devices such as magnetic disks 1030, non-volatile semiconductor memories (EEPROM, Flash, etc.) 1032, a hybrid data storage device comprising both magnetic disks and non-volatile semiconductor memories, as suggested at 1031. References 1004, 1006 and 1007 are examples of tangible, non-transitory computer-readable media having data stored thereon representing sequences of instructions which, when executed by one or more computing devices, implement aspects of the distributed system and computer-implemented methods described and shown herein. Some of these instructions may be stored locally in a client computing device, while others of these instructions may be stored (and/or executed) remotely and communicated to the client computing over the network 1026. In other embodiments, all of these instructions may be stored locally in the client or other standalone computing device, while in still other embodiments, all of these instructions are stored and executed remotely (e.g., in one or more remote servers) and the results communicated to the client computing device. In yet another embodiment, the instructions (processing logic) may be stored on another form of a tangible, non-transitory computer readable medium, such as shown at 1028. For example, reference 1028 may be implemented as an optical (or some other storage technology) disk, which may constitute a suitable data carrier to load the instructions stored thereon onto one or more computing devices, thereby re-configuring the computing device(s) to one or more of the embodiments described and shown herein. In other implementations, reference 1028 may be embodied as an encrypted solid-state drive. Other implementations are possible.

Embodiments of the present invention are related to the use of computing devices to carry out the functionality disclosed herein. According to one embodiment, the methods, devices and systems described herein may be provided by one or more computing devices in response to processor (s) 1002 executing sequences of instructions, embodying aspects of the computer-implemented methods shown and described herein, contained in memory 1004. Such instructions may be read into memory 1004 from another computer-readable medium, such as data storage device 1007 or another (optical, magnetic, etc.) data carrier, such as shown at 1028. Execution of the sequences of instructions contained in memory 1004 causes processor(s) 1002 to perform the steps and have the functionality described herein. In alternative embodiments, hard-wired circuitry may be used in place of or in combination with software instructions to implement the described embodiments. Thus, embodiments are not limited to any specific combination of hardware circuitry and software. Indeed, it should be understood by those skilled in the art that any suitable computer system may implement the functionality described herein. The computing devices may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor or integrated with the microprocessor. In another embodiment, the instructions may be stored on a disk and read into a volatile semiconductor memory before execution by the microprocessor.

Portions of the detailed description above describe processes and symbolic representations of operations by computing devices that may include computer components, including a local processing unit, memory storage devices for the local processing unit, display devices, and input devices. A command as the term is used in this disclosure may correspond to a high-level directive from a client process and may result in one or more computers executing multiple operations. An operation may include a single machine instruction. Furthermore, such processes and operations may utilize computer components in a heterogeneous distributed computing environment including, for example, remote file servers, computer servers, and memory storage devices. These distributed computing components may be accessible to the local processing unit by a communication network.

The processes and operations performed by the computer include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements.

A process, such as the computer-implemented methods described and shown herein, may generally be defined as being a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer commands, and that these terms are merely conventional labels applied to physical quantities that exist within and during operation of the computer.

It should also be understood that manipulations within the computer are often referred to in terms such as adding, comparing, moving, positioning, placing, illuminating, removing, altering and the like. The commands described herein are machine operations performed in conjunction with various input provided by a human or artificial intelligence agent operator or user that interacts with the computer. The machines used for performing the operations described herein include local or remote general-purpose digital computers or other similar computing devices.

In addition, it is to be noted that the programs, processes, methods, etc. described herein are not related or limited to any particular computer or apparatus nor are they related or limited to any particular communication network architecture. Rather, various types of general-purpose hardware machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

While certain example embodiments have been described, these embodiments have been presented by way of example only and are not intended to limit the scope of the embodiments disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

The invention claimed is:

1. A computer-implemented method, comprising:
receiving proposals to mutate a data stored in a distributed and replicated file system coupled to a network, the distributed and replicated data system comprising a plurality of nodes each comprising a server;
a metadata service configured to that maintain a replica of a namespace of the distributed and replicated file system;
coordinating updates to the data by generating an ordered set of agreements corresponding to the received proposals, the ordered set of agreements specifying an order in which the nodes are to mutate data stored in data nodes and cause changes to a state of the namespace, wherein each of the nodes is configured to delay making changes to the data stored in the data nodes and causing changes to the state of the namespace until the ordered set of agreements is received;
for each agreement in the generated ordered set of agreements, providing or identifying an index to a corresponding writers list that comprises an ordered list of nodes to execute the agreement and make corresponding changes to the namespace, each writers list comprising an ordered list of preferred operational nodes toward a first end of the writers list and failed or suspected failed nodes towards a second end of the writers list;
sending the ordered set of agreements to the plurality of nodes along with, for each agreement in the ordered set of agreements, the corresponding writers list or the identified index to the corresponding writers list, each of the plurality of nodes are configured to only execute agreements for which it is a first-listed node on the provided or identified index to the corresponding writers list;
enabling a next-listed node in the writers list to execute the agreement when a previously-listed node in the writers list has failed or is suspected of having failed, and
causing the metadata service to update the maintained replica of the namespace.

2. The computer-implemented method of claim 1, wherein providing comprises generating the writers list for at least some of the generated ordered set of agreements.

3. The computer-implemented method of claim 1, wherein providing comprising selecting from among a plurality of pre-generated writers lists.

4. The computer-implemented method of claim 1, wherein providing further comprises, after execution of a first proposal, providing a same writers list for a second proposal as was provided for the first proposal.

5. The computer-implemented method of claim 1, further comprising enabling a predetermined replacement node to execute the agreement when a first-listed node in the writers list has failed.

6. The computer-implemented method of claim 1 further comprising, by each node having executed an agreement, disseminating information relating the executed agreement to each of the plurality of nodes.

7. The computer-implemented method of claim 6, wherein disseminating further comprises guaranteeing delivery of the disseminated information.

8. The computer-implemented method of claim 1 further comprising, upon a node executing an agreement, updating a deterministic state machine with information relating to the executed agreement, the deterministic state machine being coupled to each of the other nodes and serving as a persistent messaging service between the plurality of nodes.

9. The computer-implemented method of claim 1 further comprising learning of failing or failed nodes and placing the failed or failing node at the bottom of any generated writers list.

10. The computer-implemented method of claim 1, further comprising:
pre-generating the indexed writers list for each of all possible combinations of orderings of the plurality of nodes;
distributing the pre-generated indexed writers lists to each of the plurality of nodes,
wherein providing comprises selecting one of the indexed writers lists, and
wherein sending comprises sending the ordered set of agreements to the plurality of nodes along with, for each agreement in the ordered set of agreements, an index to a selected one of the pre-generated indexed writers lists.

11. A network of servers configured to implement a distributed file system, comprising:
a plurality of data nodes, each configured to store data blocks of client files;
a plurality of nodes, each comprising a server;
a metadata service configured to maintain and update a state of a namespace of the cluster responsive to changes to the data blocks of client files;
a distributed coordination engine embedded in the metadata service and configured to coordinate received proposals to update the data blocks by generating an ordered set of agreements corresponding to the received proposals, the ordered set of agreements specifying an order in which the nodes are to mutate data stored in the data nodes;
wherein the metadata service is further configured, for each agreement in the generated ordered set of agreements, to provide or generate an index to a corresponding writers list that comprises an ordered list of nodes to execute the agreement and cause corresponding changes to the namespace, each writers list comprising an ordered list of preferred operational nodes toward a first end of the writers list and failed or suspected failed nodes towards a second end of the writers list;
and wherein the metadata service is further configured to send the ordered set of agreements to the plurality of nodes along with, for each agreement in the ordered set of agreements, the corresponding writers list or a pre-generated index thereto, such that each of the plurality of nodes is only enabled to execute agreements for which it is a first-listed node on the writers list and such that a next-listed node in the writers list is enabled to execute the agreement when a previously-listed node in the writers list has failed or is suspected of having failed.

12. The network of MDSs of claim 11, wherein the metadata service is further configured to generate the writers list for at least some of the generated ordered set of agreements.

13. The network of MDSs of claim 11, wherein the metadata service is further configured to select from among a plurality of pre-generated writers lists.

14. The network of MDSs of claim 11, wherein the metadata service is further configured to provide, after execution of a first proposal, a same writers list for a second proposal as was provided for the first proposal.

15. The network of MDSs of claim 11, wherein the metadata service is further configured to enable a predetermined replacement node to execute the agreement when a first-listed node in the writers list has failed.

16. The network of MDSs of claim 11 wherein each node having executed an agreement is further configured to disseminate information relating the executed agreement to each of the plurality of nodes.

17. The network of MDSs of claim 11 wherein, upon executing an agreement, the node is further configured to update a deterministic state machine with information relating to the executed agreement, the deterministic state machine being coupled to each of the other nodes and serving as a persistent messaging service between the plurality of nodes.

18. The network of MDSs of claim 11, wherein the metadata service is further configured to learn of failing or failed nodes and to place the failed or failing node at the bottom of any generated writers list.

19. The network of MDSs of claim 11, wherein the metadata service is further configured to:

pre-generate the indexed writers list for each of all possible combinations of orderings of the plurality of nodes;

distribute the pre-generated indexed writers lists to each of the plurality of nodes, and send the ordered set of agreements to the plurality of nodes along with, for each agreement in the ordered set of agreements, and an index to a selected one of the pre-generated indexed writers lists.

* * * * *